(12) United States Patent
Borella

(10) Patent No.: US 7,305,429 B2
(45) Date of Patent: Dec. 4, 2007

(54) METHOD AND APPARATUS FOR GLOBAL SERVER LOAD BALANCING

(75) Inventor: Michael S. Borella, Naperville, IL (US)

(73) Assignee: UTStarcom, Inc., Rolling Meadows, IL (US)

( * ) Notice: Subject to any disclaimer, the term of this patent is extended or adjusted under 35 U.S.C. 154(b) by 0 days.

(21) Appl. No.: 10/166,279

(22) Filed: Jun. 10, 2002

(65) Prior Publication Data

US 2003/0229697 A1 Dec. 11, 2003

(51) Int. Cl.
*G06F 15/16* (2006.01)

(52) U.S. Cl. .............. 709/203; 709/202; 709/219; 709/222; 709/226; 709/228; 709/235; 709/244; 455/433; 710/9; 711/200

(58) Field of Classification Search ........ 709/201–253; 455/433; 370/351; 710/9; 711/200
See application file for complete search history.

(56) References Cited

U.S. PATENT DOCUMENTS

| | | | | |
|---|---|---|---|---|
| 5,898,681 | A | 4/1999 | Dutta ......................... | 370/229 |
| 6,023,722 | A | 2/2000 | Colyer ....................... | 709/201 |
| 6,138,159 | A * | 10/2000 | Phaal ......................... | 709/226 |
| 6,185,616 | B1 * | 2/2001 | Namma et al. ............. | 709/227 |
| 6,195,705 | B1 * | 2/2001 | Leung ........................ | 709/245 |
| 6,230,012 | B1 * | 5/2001 | Willkie et al. ........... | 455/435.1 |
| 6,324,577 | B1 * | 11/2001 | Hirai .......................... | 709/223 |
| 6,393,482 | B1 * | 5/2002 | Rai et al. .................... | 709/225 |
| 6,400,722 | B1 * | 6/2002 | Chuah et al. ............... | 370/401 |
| 6,434,134 | B1 * | 8/2002 | La Porta et al. ............ | 370/338 |
| 6,442,165 | B1 * | 8/2002 | Sitaraman et al. ....... | 370/395.4 |
| 6,466,571 | B1 * | 10/2002 | Dynarski et al. ........... | 370/352 |
| 6,501,746 | B1 * | 12/2002 | Leung ........................ | 370/338 |
| 6,507,908 | B1 * | 1/2003 | Caronni ..................... | 713/153 |
| 6,512,754 | B2 * | 1/2003 | Feder et al. ................ | 370/338 |
| 6,560,217 | B1 * | 5/2003 | Peirce, Jr. et al. ......... | 370/351 |
| 6,578,088 | B2 * | 6/2003 | Ohno et al. ................ | 709/245 |
| 6,587,882 | B1 * | 7/2003 | Inoue et al. ................ | 709/227 |
| 6,598,071 | B1 * | 7/2003 | Hayashi et al. ............ | 709/203 |

(Continued)

OTHER PUBLICATIONS

"GLSB", Nortell Networks (53 pages), no date.

(Continued)

*Primary Examiner*—Michael Won
(74) *Attorney, Agent, or Firm*—McDonnell Boehnen Hulbert & Berghoff LLP

(57) ABSTRACT

A system and method are shown for load balancing across global network resources using an existing network protocol, such as Mobile IP, having a redirect feature. According to one method, each of a plurality of servers at a data center uses Mobile IP to obtain an IP address that is also provided to a content server site. Further, a content server site includes a plurality of IP addresses assigned to the plurality of servers and creates a load database including load data for each server. When a client request is received at the content server site from a client device, the content server site determines a network address of a server to process the client request based on the load data, and provides the network address of the server to the client device. When the client device receives the network address of the server, the client device sends an application request to the selected server, and the selected server sends an application response to the client device.

4 Claims, 8 Drawing Sheets

U.S. PATENT DOCUMENTS

| | | | | |
|---|---|---|---|---|
| 6,633,761 | B1* | 10/2003 | Singhal et al. | 455/436 |
| 6,654,607 | B1* | 11/2003 | Shobatake et al. | 455/433 |
| 6,687,735 | B1* | 2/2004 | Logston et al. | 709/203 |
| 6,691,227 | B1* | 2/2004 | Neves et al. | 713/162 |
| 6,697,355 | B1* | 2/2004 | Lim | 370/352 |
| 6,697,360 | B1* | 2/2004 | Gai et al. | 370/389 |
| 6,708,031 | B2* | 3/2004 | Purnadi et al. | 455/436 |
| 6,725,264 | B1* | 4/2004 | Christy | 709/225 |
| 6,751,677 | B1* | 6/2004 | Ilnicki et al. | 719/316 |
| 6,771,623 | B2* | 8/2004 | Ton | 370/331 |
| 6,792,474 | B1* | 9/2004 | Hopprich et al. | 709/245 |
| 6,851,050 | B2* | 2/2005 | Singhal et al. | 713/162 |
| 6,876,640 | B1* | 4/2005 | Bertrand et al. | 370/331 |
| 6,894,994 | B1* | 5/2005 | Grob et al. | 370/335 |
| 6,928,282 | B2* | 8/2005 | Taniguchi | 455/433 |
| 6,973,057 | B1* | 12/2005 | Forslow | 370/328 |
| 6,985,464 | B2* | 1/2006 | Harper et al. | 370/331 |
| 6,987,771 | B2* | 1/2006 | Shimizu et al. | 370/401 |
| 6,993,583 | B2* | 1/2006 | Anderson et al. | 709/226 |
| 7,095,715 | B2* | 8/2006 | Buckman et al. | 370/230 |
| 7,103,647 | B2* | 9/2006 | Aziz | 709/220 |
| 7,117,258 | B2* | 10/2006 | Lee et al. | 709/222 |
| 7,152,118 | B2* | 12/2006 | Anderson et al. | 709/245 |
| 7,158,492 | B2* | 1/2007 | Haverinen | 370/328 |
| 2001/0021175 | A1* | 9/2001 | Haverinen | 370/230 |
| 2002/0023159 | A1* | 2/2002 | Vange et al. | 709/228 |
| 2002/0059452 | A1* | 5/2002 | Yokota et al. | 709/238 |
| 2002/0101857 | A1* | 8/2002 | Heller | 370/352 |
| 2002/0114323 | A1* | 8/2002 | Chowdhury et al. | 370/352 |
| 2002/0194385 | A1* | 12/2002 | Linder et al. | 709/250 |
| 2003/0200333 | A1* | 10/2003 | Espieu et al. | 709/240 |
| 2003/0217180 | A1* | 11/2003 | Chandra et al. | 709/245 |

OTHER PUBLICATIONS

"Internet Protocol: DARPA Internet Program Protocol Specification", RFC: 791, Sep. 1981 (46 pages).

P. Mockapetris, "Domain Names—Concepts and Facilities", RFC: 1034, Nov. 1987 (49 pages).

C. Perkins, editor, "IP Mobility Support", RFC: 2002, Oct. 1996 (70 pages).

P. Gross, editor, Choosing a 'Common IGP' for the IP Internet (The IESG's Recommendation to the IAB), RFC: 1371, Oct. 1992 (8 pages).

P. Mockapetris, editor, "Domain Names—Implementation and Specification", RFC: 1035, Nov. 1987 (46 pages).

Y. Rekhter, editor, "A Border Gateway Protocol 4 (BGP-4)", RFC: 1771, Mar. 1995 (50 pages).

J. Moy, editor, "OSPF Version 2", RFC: 2328, Apr. 1998 (191 pages).

* cited by examiner

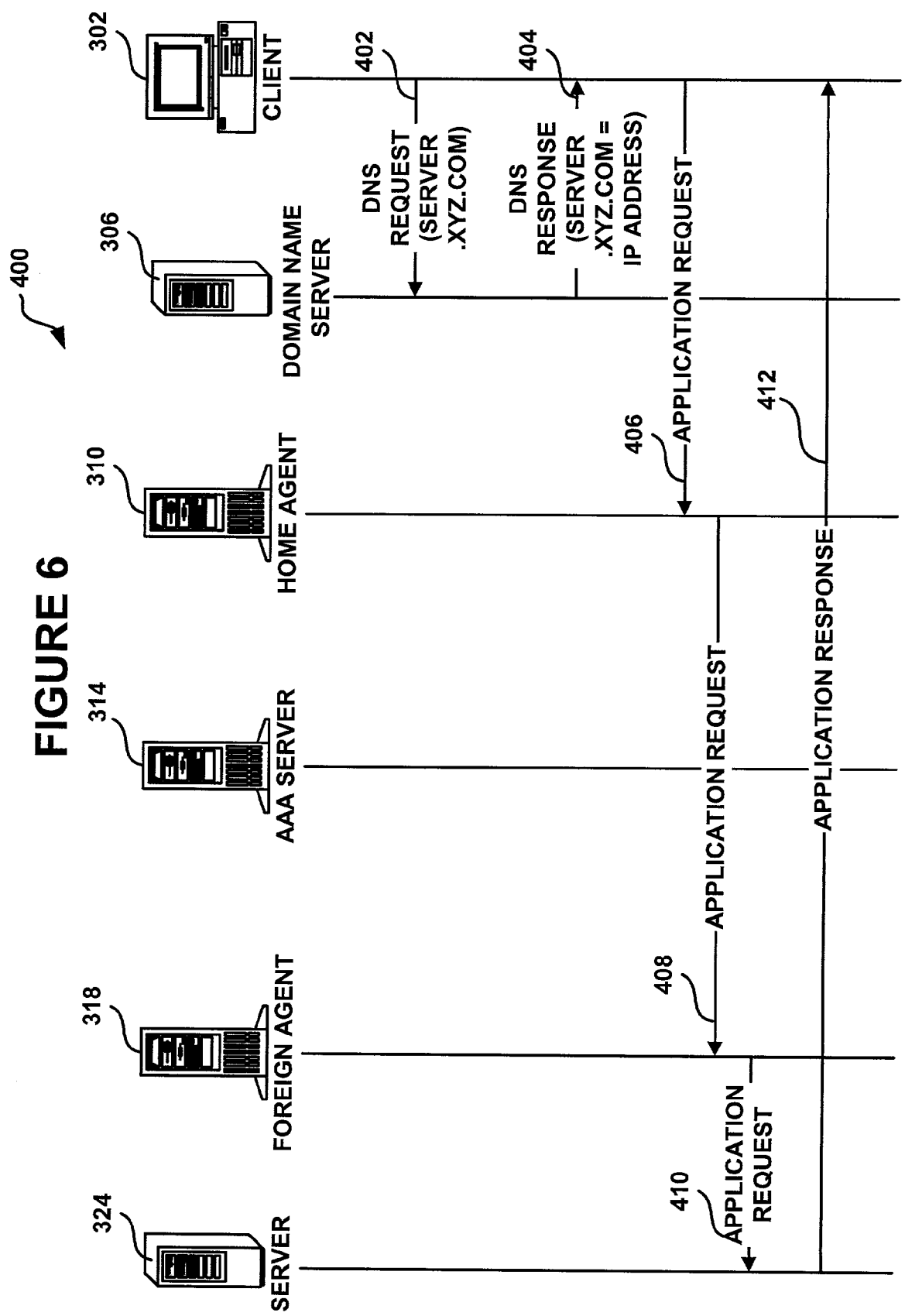

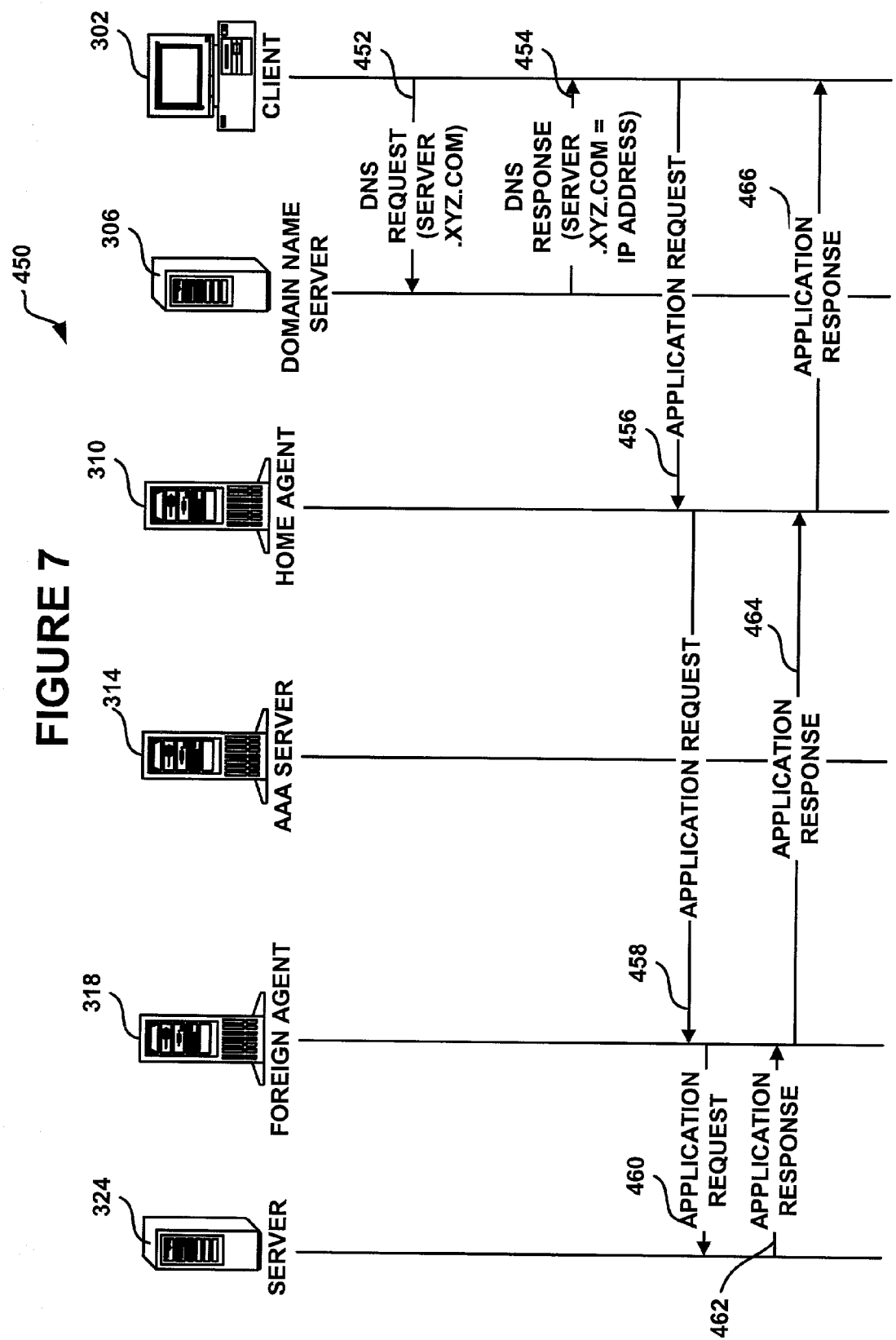

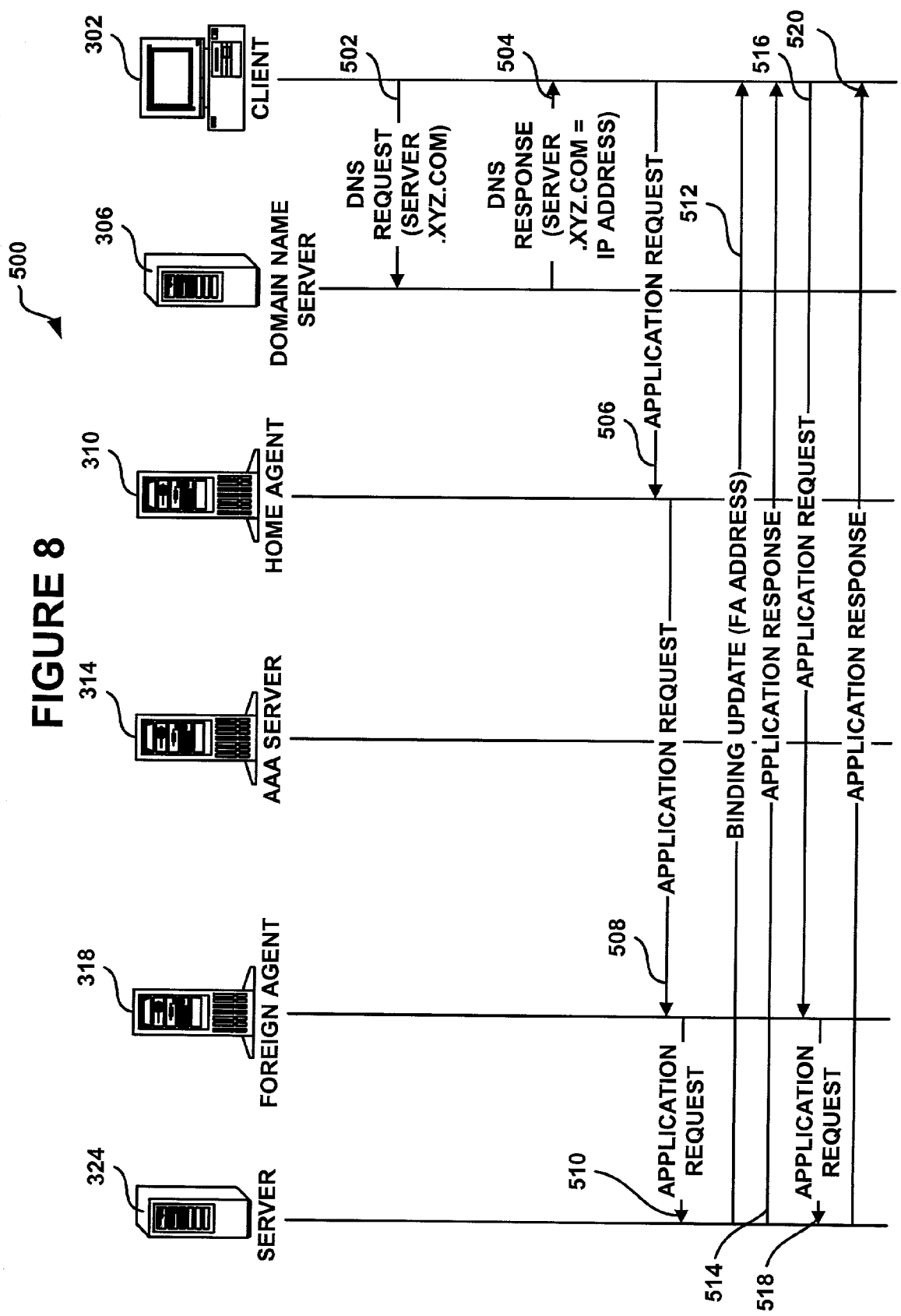

METHOD AND APPARATUS FOR GLOBAL SERVER LOAD BALANCING

FIELD OF INVENTION

The present invention relates to data communications. More specifically, it relates to routing of packets between a client device and server devices connected via a network.

BACKGROUND OF THE INVENTION

As use of networks, such as the Internet or the Web, expands, on-line companies are finding it necessary to provide multiple large-scale data centers to deliver efficient and reliable service to their customers.

FIG. 1 illustrates an example of architecture 10 involving an Internet Protocol (IP) network 30 to which a client device 20 is linked via a communication link 22. A content owner server 60 is linked to the IP network 30 via a communication link 62. Generally, a network address, such as a Universal Resource Locator (URL), is resolved through Domain Name System address resolution to a network IP address for the content owner server 60. For example, www.3com.com will be resolved to a particular network IP address for a content server. Also accessible via the IP network 30 are a data center A 40 and a data center B 50, which are coupled to the IP network 30 via communication links 42 and 52, respectively.

Typically, a client request is addressed to a network address corresponding to an access service provider or a content owner's central site, e.g. www.3com.com. The client's request is then forwarded to a data center for further processing. In FIG. 1, a request 24 from the client device 20 is addressed to the content owner's URL, which is then resolved to the network IP address of the content owner server 60. The request from the client device 20 is then forwarded to the data center A 40 selected by the content owner server 60 based on a global server load sharing approach.

A global server load sharing approach must first address the global issue of which data center to forward the client's request. The data centers 40 and 50 may be geographically distant from one another, the content owner server 60, and the clients being serviced. The centers may be located hundreds or thousands of miles away and may even be located on different continents. The data centers may be topologically distant as well, meaning that they may be many hops away from one another over the same Internet Protocol (IP), RFC 791, backbone network, or they may be served by entirely different backbone networks coupled together via intermediate gateways or interconnecting networks. In other words, the IP network 30 may actually be composed of multiple networks that are interconnected.

The load sharing approach must then address the local load sharing issue of which server device to allocate to the request. Each data center 40 and 50 typically includes a server farm, a network site composed of a large number of server devices that processes client transactions.

There are many solutions for global server load balancing. A Domain Name System (DNS) based solution involves a DNS database that includes proximity and load information of potential servers. See RFCs 1034 and 1035. The client device's local DNS includes this information and either proxies or forwards the client's DNS request to the appropriate data center's DNS server based on the proximity or load information. The DNS server then replies with an individual server's IP address that is selected based on the proximity and load information. The prior art systems propagate DNS updates across wide area networks that require timing out cached entries. However, the complex matter of how DNS caching and timeout of the load and proximity information is handled has not yet been resolved by the Internet Engineering Task Force (www.ietf.org).

Another approach is Host Route Injection ("HRI"), wherein load balancing routers or another type of entity injects weighted routes into Border Gateway Protocol (BGP), RFC 1771, or Interior Gateway Protocol (IGP), RFC 1371, routing databases, i.e. Open Shortest Path First (OSPF) RFC 2328. This approach also works reasonably well, but suffers from some drawbacks. For example, the routing table size grows with the number of clients since routes are created for each client and must be updated all the time. If the routes are not frequently updated, the routing table includes less accurate load and proximity information. Also, fine-grained load balancing may be difficult, because routing protocols require time, on the order of minutes, to converge. Further, route updates may cause route flapping.

Yet another global load balancing approach involves triangle data forwarding. In this approach, all client requests are forwarded to a single data center, and that data center decides whether to serve the requests or forward them to another data center that has closer proximity or a lower load level. This approach can place an unnecessary burden on the forwarding data center. Also, triangle routing adds latency and inefficiency to the communication stream. Furthermore, if the primary data center fails, then another mechanism, such as DNS, is needed to prevent system failure and provide high availability.

Thus, the need still remains for an improved method for global server load balancing.

SUMMARY OF THE INVENTION

The system and methods described herein are for dynamic network address assignment to a plurality of servers at a data center in an Internet Protocol network.

One exemplary method includes providing a plurality of foreign agents at a data center, and using a Mobile Internet Protocol to dynamically assign a network address to each of the plurality of servers at the data center. The method further includes providing a plurality of home agents at a content owner site. In such an embodiment, using the Mobile Internet Protocol to dynamically assign a network address to each of the plurality of servers at the data center includes selecting a foreign agent for each of the plurality of servers, sending a registration request message comprising a request for a network address assignment from each server to the selected foreign agent, determining a home agent to service the registration request, forwarding the registration request message to the selected home agent, allocating a network address to the server at the home agent, and providing the network address to the server.

One exemplary system includes a data center including a plurality of servers and at least one foreign agent, where each server is configured to use a mobile Internet Protocol to dynamically request a network address, and each of the plurality of servers is further configured to process a client application request from a client to form an application response to the client device. Further, the system includes a content server site having a first virtual network address, and the content server site is configured to obtain network addresses of the plurality of servers at the data center. According to an exemplary embodiment, the content server site further comprises load data of the plurality of servers, and the content server site is configured to receive a client request from the client device, where the client request is addressed to the first virtual address. Responsively, the content server site is configured to determine a selected server from the plurality of servers using the load data for the plurality of servers, and send a client response to the client device, where the client response includes a network address of the selected server.

The foregoing and other features and advantages of a preferred embodiment of the present invention will be more readily apparent from the following detailed description, which proceeds with references to the accompanying drawings.

BRIEF DESCRIPTION OF THE DRAWINGS

The present invention is described in the context of an embodiment of the invention with reference to the following drawings, wherein:

FIG. 6 is a block diagram illustrating a message flow for load balancing client requests according to one exemplary embodiment using a triangular routing mechanism;

FIG. 7 is a block diagram illustrating a message flow for load balancing client requests according to another exemplary embodiment using a reverse tunneling mechanism; and FIG. 8 is a block diagram illustrating a message flow for load balancing client requests according to one exemplary embodiment using a route optimization mechanism.

DETAILED DESCRIPTION OF PREFERRED EMBODIMENTS

Figure 1:
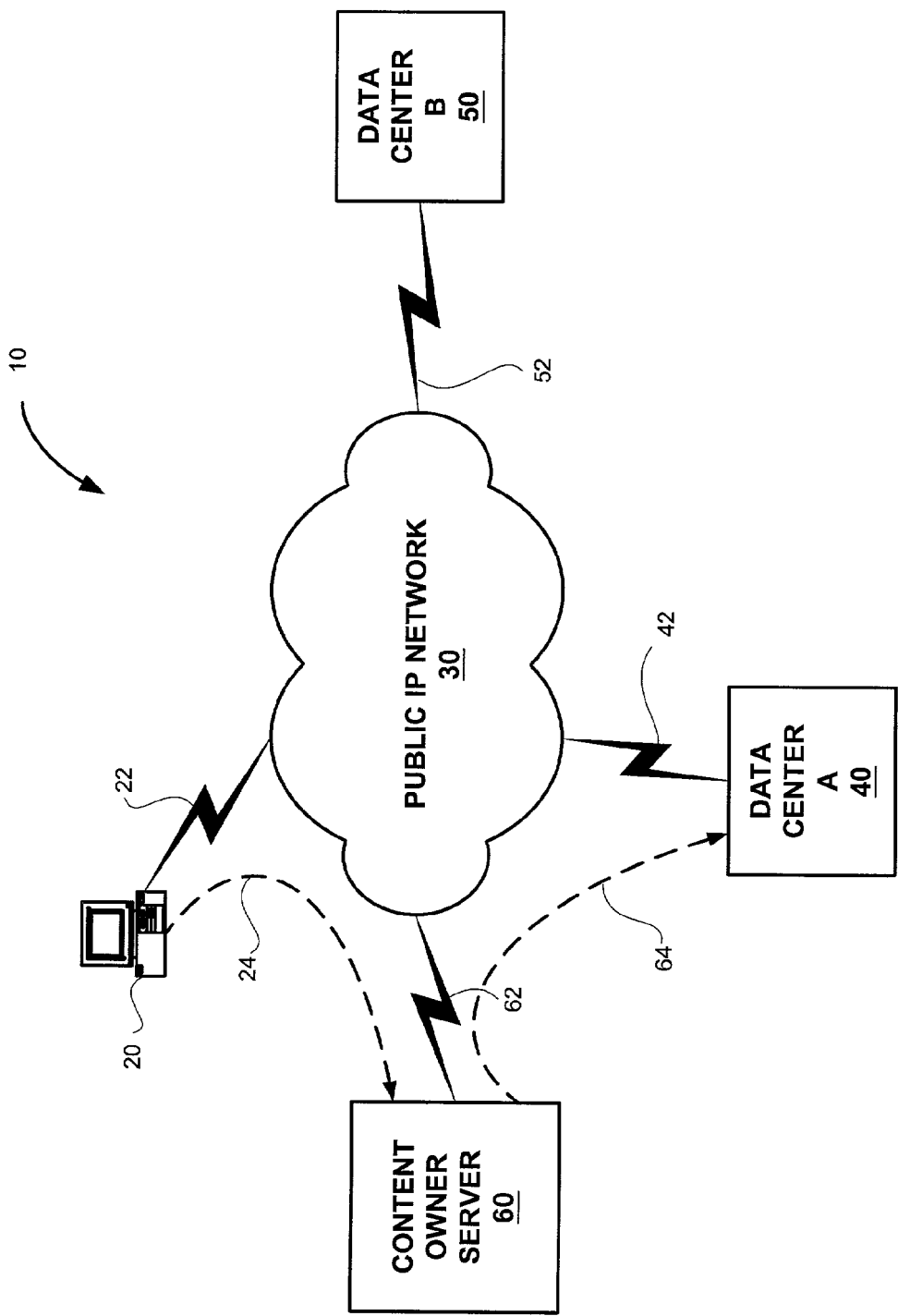
FIG. 1 is a functional block diagram illustrating a network architecture having a content server that forwards a client request to one of two data centers based on a load sharing scheme.

Described herein is a method and architecture for global server load balancing. The system utilizes the architecture of Mobile IP, RFC 2002, to perform server load balancing. It is well known that Mobile IP has been proposed to support mobility for wireless devices. However, according to exemplary embodiments described herein, Mobile IP is used to perform load balancing for devices attached to an IP network.

The Internet Protocol ("IP") is an addressing protocol designed to route traffic within a network or between networks. The Internet Protocol is used on many computer networks including the Internet, intranets and other networks. Internet Protocol addresses are typically assigned to "immobile" nodes on a network, and the IP address of each node is used to route datagrams to the node through a server connected to the node. An immobile node may be transferred to a different server on the computer network, but is typically associated with a static physical location (e.g., 3Com Corporation in Santa Clara, Calif.).

In contrast, mobile nodes may connect to various physical locations on a computer network from various physical connections. A mobile node has its own network address and a semi-permanent relationship with a home agent or server to which the mobile node may occasionally be connected to send and receive datagrams. However, the mobile node can also connect to a home agent by way of a foreign agent through which it sends and receives datagrams. An example of one protocol that facilitates communication with mobile nodes over the Internet is the Mobile Internet Protocol (Mobile IP), which allows "mobile" nodes to transparently move between different Internet Protocol sub-networks ("subnets"). Mobile IP is described in Request for Comment (RFC) 2002, *IP Mobility Support*, C. Perkins, October 1996, herein incorporated by reference, available from the Internet Engineering Task Force (IETF) at www.ietf.org.

Internet Protocol addresses are typically assigned to mobile nodes based on their home Internet Protocol subnet. The home subnet is connected to an external network (e.g., the Internet or an intranet) with a "home agent" that may serve as the subnet's gateway router. As is known in the art, the gateway connects computer networks using different networking protocols or operating at different transmission capacities. As is known in the art, a router translates differences between network protocols and routes data packets to an appropriate network node or network device. When a mobile node "roams," (i.e., dynamically changes its physical location, thereby altering its point of connection to the network), it periodically transmits "agent solicitation" messages to other gateway routers. A mobile node also listens for "agent advertisement" messages from other gateway routers. When a mobile node receives an agent advertisement message indicating that it is now on a foreign subnet, it registers with the foreign gateway router or "foreign agent" and its home agent. The registration with the home agent indicates that the mobile node is away from "home" (i.e., away from its home subnet). The registration with the foreign agent allows the mobile node to receive data on the foreign subnet.

Figure 2:
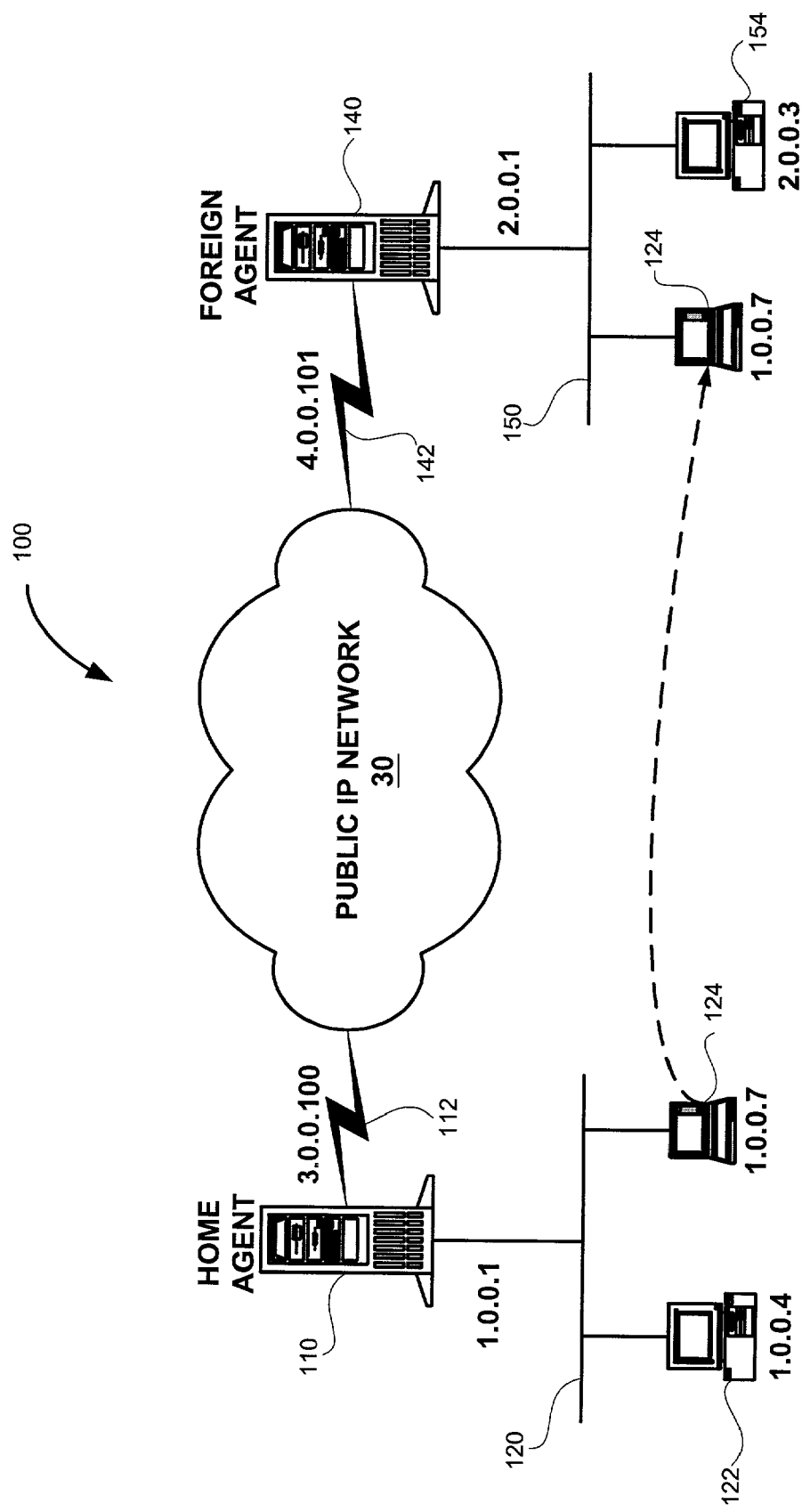
FIG. 2 is a functional block diagram illustrating the movement of a mobile node from a home network to a foreign network.

FIG. 2 shows an architecture 100 that illustrates an example of the connection of a mobile node (MN) 124 to the public IP network 30. The public IP network 30 includes a mobile node's home agent 110 and a foreign agent 140. The home agent 110 is coupled to the IP network 30 via a communication link 112 and has a globally routable network address of 3.0.0.100 on the network 30. The home agent 110 is also coupled to a local area network 120 that is the home subnet of the mobile node 124. The home subnet is 1.0.0.0/24. Other nodes are also connected to the home subnet 120, such as a node 122 with a globally routable network address of 1.0.0.4. The MN 124 has a globally routable IP address value of 1.0.0.7.

The foreign agent 140 is coupled to the IP network 30 via a communication link 142 and has a globally routable network address of 4.0.0.101 on the network 30. The foreign agent 140 is also coupled to a local area network (LAN) 150 that constitutes a foreign subnet to the MN 124. The subnet served by the foreign agent 140 is 2.0.0.0/24. Other nodes are also connected to the subnet 150, such as a node 154 with a globally routable network address 2.0.0.3.

Mobile IP allows a mobile node to dynamically change its network connectivity in a manner that is transparent to layers above IP and the user. All MNs are assigned an IP address on their home subnet, which is the default subnet for the MN unless the MN is informed otherwise. The home subnet is coupled to the IP network 30 via the home agent 110, which is the subnet's gateway router. When an MN roams, e.g. moves to a service area or subnet other than its home subnet (as illustrated by the dashed arrow), it periodically transmits "agent solicitation" messages onto the subnet to which it is coupled and listens for an agent "advertisement message" from gateway routers. When the MN receives an agent advertisement message indicating that it is now on a different subnet, then it registers with the foreign gateway router. For example, when the MN 124 connects to the LAN 150, it will transmit an agent solicitation message onto the LAN 150 that will be received by the foreign agent 140, which is the gateway router for the 2.0.0.0/24 subnet. The foreign agent 140 will respond by transmitting an agent advertisement message on the LAN 150 that will be received by the MN 124.

When the MN 124 receives the agent advertisement message from the foreign agent 140, it will register itself with the foreign agent 140 and with its home agent 110. When the MN 124 registers with the foreign agent 140, the foreign agent 140 will create a routing table entry for the network address 1.0.0.7 of the MN 124. The home agent 110 will also create a routing table entry for the MN 124 that includes the network address 4.0.0.101 for the foreign agent 140 to which the MN 124 is presently connected.

Figure 3:
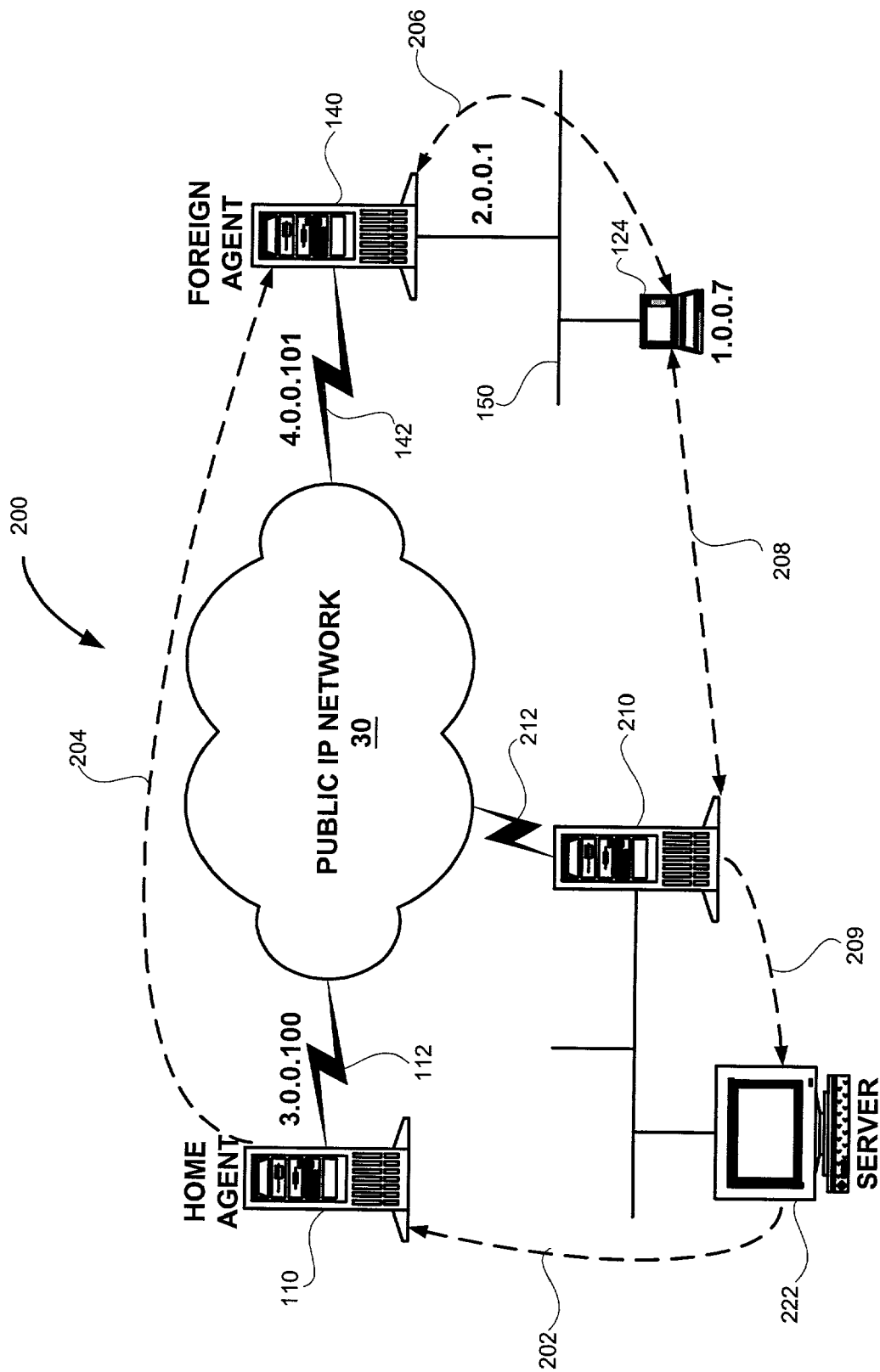
FIG. 3 is a functional block diagram illustrating a triangular message pathway that results under Mobile IP for a message to a mobile node coupled to a foreign network.

After registration has taken place, routing to the MN 124 is redirected from the home agent 110 to the foreign agent 140 identified in the registration, e.g. the redirect feature of Mobile IP. Round trip routing to and from MN 124 may be subsequently asymmetric. Routing between the MN and a server follows a triangular path between the server, the home agent 110 and the foreign agent 140. The architecture 200 of FIG. 3 illustrates this scenario. In the network 30, the home agent 110 is advertising itself as a route to the 1.0.0.0/24 subnet. Therefore, the home agent 110 will receive all packets addressed to the MN 124 with an address of 1.0.0.7. However, the MN 124 has registered its current foreign agent 140, with the home agent 110. Thus, when the home agent 110 receives a packet for the MN 124, e.g. a packet represented by arrow 202 from the server 222 in FIG. 3, the home agent 110 will tunnel the packet to the foreign agent 140, where the tunneled packet is represented by arrow 204. When the foreign agent 140 receives the tunneled packet 204, it strips off the outer IP headers corresponding to the tunnel and transmits the packet over the LAN 150 to the MN 124, as represented by arrow 206. When the MN 124 transmits a packet, no tunneling or address translation is necessary. IP packets from the MN 124 are routed directly from the MN 124 through the foreign agent 140 to the external destination address on the IP network 30, as illustrated by arrows 208 and 209 for packets destined for the server 222.

In architecture 200, the MN 124, the foreign agent 140 and the home agent 110 maintain as little state information for the transaction as is possible. The MN 124 periodically transmits "keepalive" messages that inform the foreign agent 140 and the home agent 110 that it is still connected to the foreign agent's subnet. These updates are transmitted using Internet Control Message Protocol (ICMP) messages, see RFCs 792 and 2463, some of which are standard ICMP messages and others that are unique to Mobile IP.

Route optimization is a newer feature for Mobile IP that was introduced in Mobile IPv4 and is mandatory in Mobile IPv6. In route optimization, the MN sends a binding update message to a correspondent node (CN) indicating the MN's care-of address (COA). The CN then tunnels all subsequent packets (or, in the case of IPv6, uses a routing header) for the MN via the COA. This removes the home agent from the routing path and allows the triangular routing of packets for the MN to be eliminated.

By combining features of an existing mobility-based protocol with the standard IP architecture, the standard IP architecture may be modified to provide a novel load balancing mechanism. In one embodiment, home agents are placed at the content owner site 60, and foreign agents are placed at each data center 40 and 50. According to an exemplary embodiment, the Mobile IP architecture is mapped onto the standard IP architecture of FIG. 1, and load balancing for the standard IP architecture may be obtained using the redirect feature of an existing protocol, such as Mobile IP.

Figure 4:
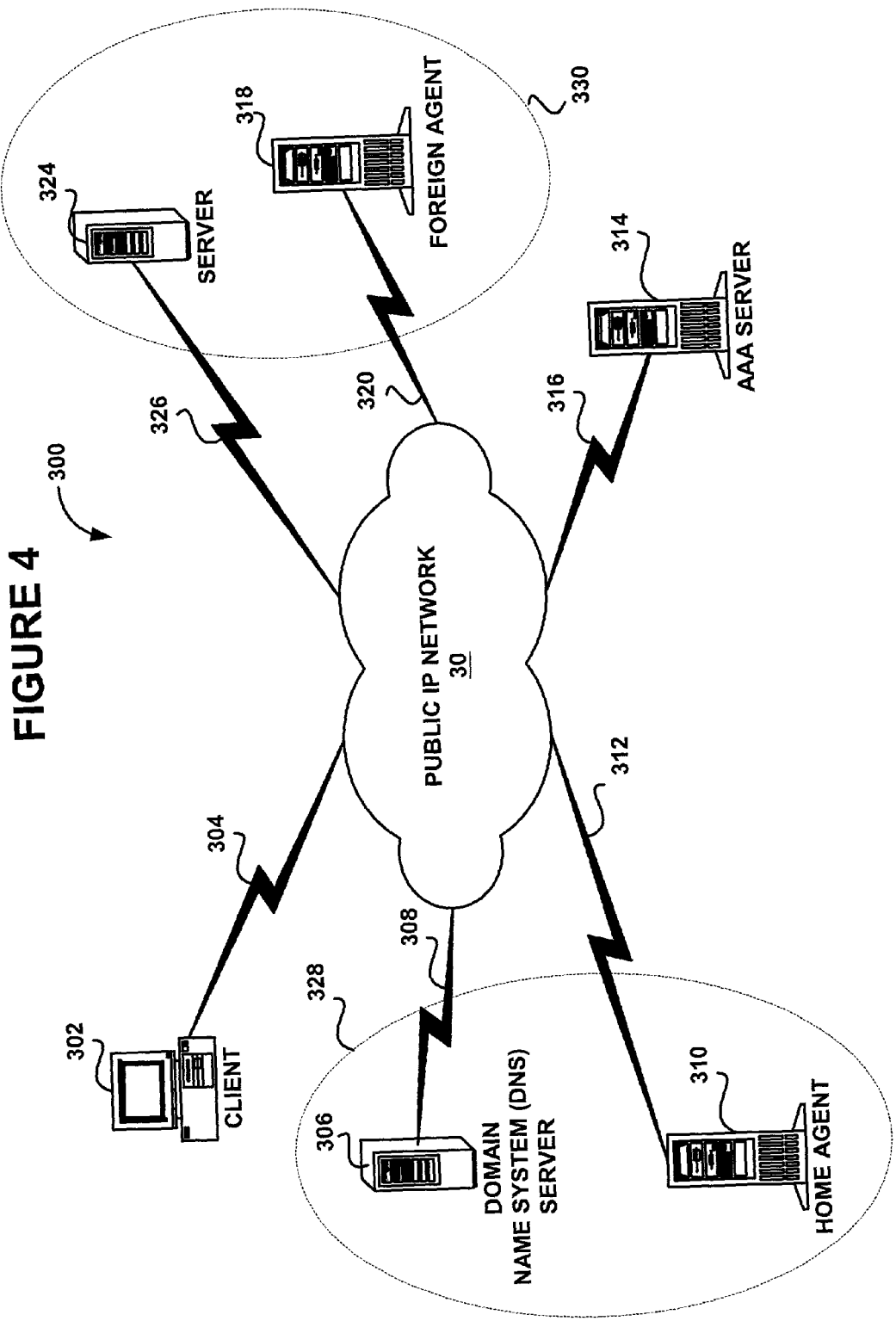
FIG. 4 is a functional block diagram illustrating a network architecture for server load balancing according to one exemplary embodiment.

FIG. 4 shows a network architecture 300 that illustrates an exemplary embodiment of a network implementing global server load balancing. The network architecture 300 includes a client device 302 coupled to the IP network 30 via a communication link 304, an authorization, authentication and accounting ("AAA") server 314, a content owner site 328 including a home agent 310 and a content owner site server illustrated as a DNS server 306, and a data center 330 including a foreign agent 318 and a server 324. The DNS server 306 is coupled to the IP network 30 via a communication link 308, the home agent 310 is coupled to the IP network 30 via a communication link 312, the foreign agent 318 is coupled to the IP network 30 via a communication link 320, the AAA server 314 is coupled to the IP network 30 via a communication link 316, and the server 324 is coupled to the IP network 30 via a communication link 326. According to an exemplary embodiment, the server device 324 and the foreign agent 318 are located at a data center or a server hosting facility, and the home agent 310 and the DNS 306 are located at a content provider's site. However, different embodiments are possible as well. For example, in one embodiment, the home agent 310 and the DNS server 306 do not have to be co-located. In addition, there may be numerous data centers associated with one or more content provider sites.

In one embodiment of the present invention, a virtual IP address (e.g. a.b.c.d) is established for the content owner's DNS name. For example, DNS may be configured so that the content owner's DNS name (e.g. www.3com.com) maps to the virtual IP address. The content owner then advertises a route to this address through the IP network 30. Thus, when the client device 302 sends a request for the DNS name, the DNS name is resolved to the virtual IP address, and the request is routed to the content owner server site 328, i.e., the DNS 306. According to an exemplary embodiment that will be described in greater detail below, the DNS server 306 stores load data for servers at various data centers, such as the server 324. Further, in addition to the load data, the DNS server 306 stores IP addresses dynamically assigned to the servers, the process of which will be described in greater detail below.

When a session is mapped to a data center, such as the data center 330, the home agent 310 may tunnel packets from the client device 302 to the selected data center's router. In such an embodiment, the data center's router maintains session information on all active client sessions and provides appropriate session timeouts.

Figure 5:
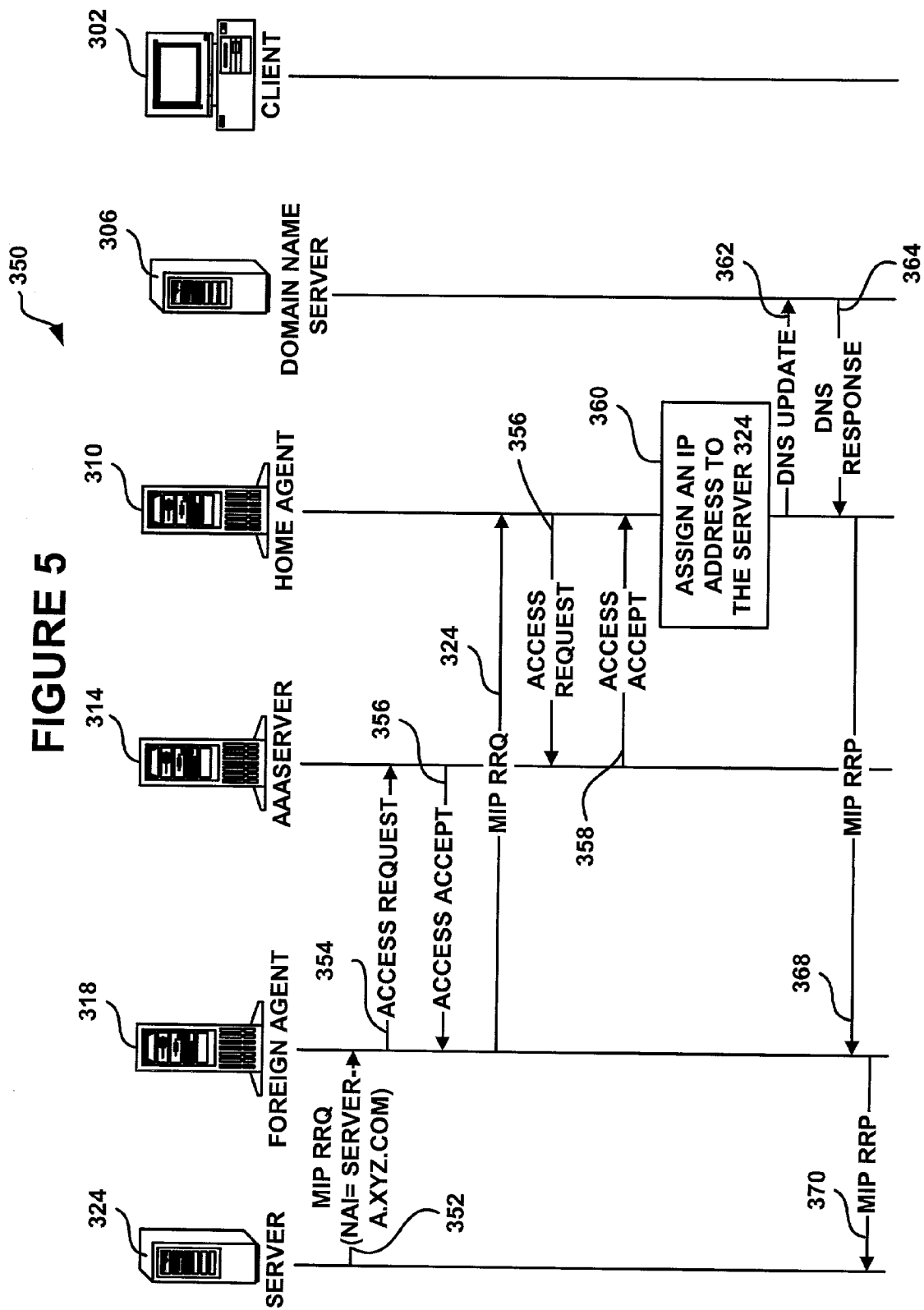
FIG. 5 is a block diagram illustrating a message flow for dynamic server registration using Mobile IP according to one exemplary embodiment.

FIG. 5 is a block diagram illustrating a message flow 350 for dynamic server registration according to one exemplary embodiment using Mobile IP. The message flow 350 will be described in reference to the devices illustrated in FIG. 4. However, it should be understood that different entities could also be used.

According to an exemplary embodiment, when the server 324 boots, the server 324 sends a Mobile IP Registration Request ("MIP RRQ") message 352 to the local foreign agent 318. For instance, the server 324 may be preprogrammed with an address of a predetermined foreign agent. Alternatively, the foreign agent 318 may have advertised its presence with an ICMP agent advertisement message. The MIP RRQ message 352 generated at the server 324 includes a request for a dynamic network address assignment. Specifically, the MIP RRQ message 352 includes a home IP address (an IP address to be assigned to the server 324) and a home agent IP address of 0.0.0.0 indicating that the server 324 requests a dynamic network assignment and a dynamic home agent assignment. The MIP RRQ message 352 also includes a network access identifier ("NAI") of the server 324, such as an identifier "server-a.xyz.com," which is a globally unique name. Additionally, the server 324 may also include other information in the MIP RRQ message 352, such as information indicating the server's capabilities. For example, a server may be configured to serve secure online transactions.

When the foreign agent 318 receives the MIP RRQ message 352, the foreign agent 318 sends an AAA Access Request message 354 to the AAA server 314. The Access Request message 354 includes the home IP and home agent IP addresses indicated by the server 324, i.e., IP address of 0.0.0.0. Further, the Access Request message 354 may include the capabilities of the server 324. When the AAA server 314 receives the Access Request message 354, the AAA server 314 dynamically allocates a home agent to the server 324 based on the information provided in the Access Request message 354. For instance, the AAA server 314 may use the network access identifier of the server 324 to determine an IP address of a home agent that serves the domain name specified by the server. For instance, if the server 324 uses an identifier "server-a.xyz.com," the AAA server 314 may select a home agent that is operated by "xyz.com." It should be understood that different selection mechanisms are also possible. For example, the AAA server 314 may include a pool of home agent addresses that may be used to provide IP addresses to "xyz.com." In such an embodiment, the AAA server 314 may use a round robin algorithm, or a different algorithm, to load balance the requests between the available home agents. Alternatively, an IP address of a home agent that is configured to serve requests associated with "xyz.com" may be hardcoded on the AAA server 314.

Further, in an alternative embodiment, the foreign agent 318 may be programmed with a number of home agent address pools, each including at least one IP address of a home agent. In such an embodiment, the AAA server 314 may instruct the foreign agent 318 to select a home agent IP address from a predetermined home agent pool.

As illustrated in the exemplary message flow 350, the AAA server 314 selects the home agent 310 for the server 324, and sends an AAA Access Accept message 356 to the foreign agent 318. The AAA Access Accept message 356 includes an IP address of the home agent 310, such as an IP address "149.112.150.24," for instance. When the foreign agent 318 receives the Access Accept message 356, the foreign agent 318 forwards the MIP RRQ message 352 received from the server 324 to the home agent 310, as illustrated at 354.

When the home agent 310 receives the MIP RRQ message, the home agent 310 sends an AAA Access Request message 356 to the AAA server 314 to authorize the received request. The Access Request message 356 may indicate a home IP address of "0.0.0.0," the capabilities of the server 324, and the server's NAI. Upon a successful authorization, the AAA server 314 sends an AAA Access Accept message 358 that may indicate additional attributes, such as a network address of the DNS server 306, to the home agent 310. Alternatively, the home agent 310 may be preprogrammed with the network address of the DNS server 306. Then, at 360, the home agent 310 dynamically assigns an IP address to the server 324. For instance, the home agent 310 may select the IP address for the server 324 from a local pool of IP addresses available at the home agent 310. For instance, the home agent 310 may allocate an IP address of "149.112.150.101" to the server 324.

The home agent 310 may then perform a DNS update to the local DNS 306 indicating that the domain name "server.xyz.com" may now be mapped to the assigned server's IP address. To do that, the home agent 310 sends a DNS update message 362 including the domain name "server.xyz.com" and the IP address of "149.112.150.101." When the DNS 306 receives the DNS update message 362, it may create a mapping between the specified domain name and the IP address. It should be understood that the DNS 306 may include a number of IP addresses for the same domain name entry, and the DNS may load balance the incoming requests to the registered servers associated with that domain name. It should be understood that the DNS 306 may use any existing or later developed load balancing mechanisms, and the exemplary embodiments are not limited to any particular load balancing method. Then, as illustrated at FIG. 5, the DNS 306 responds with a DNS response message 364 indicating that the DNS update was successful.

When the home agent 310 receives the DNS response message 364, the home agent 310 sends a Mobile IP Registration Response ("MIP RRP") message 366 to the foreign agent 318. The MIP RRP message 366 includes the IP address assigned to the server 318. Specifically, in this exemplary embodiment, the MIP RRP message 366 includes the IP address of "149.112.150.101," and the foreign agent 318 forwards the MIP RRP to the server 324, as illustrated at 368, and the server registration process terminates.

According to an exemplary embodiment, the server 324 may periodically reregister with the home agent 310. In such an embodiment, during subsequent registrations, the server 324 may request the same IP address. Further, in such an embodiment, the home agent 310 may send an update message the DNS 306 every time the server 324 reregisters, and, if the DNS 306 does not receive one or more such updates, the DNS 306 may mark the server 324 as inactive.

FIG. 6 is a block diagram illustrating a message flow 400 for load balancing client requests according to one exemplary embodiment. Specifically, the message flow 400 illustrates serving an initial client transaction using a triangular routing mechanism. Similarly, the message flow 400 will be described in reference to the devices illustrated in FIG. 4. However, it should be understood that different devices could also be used.

Referring to FIG. 6, the client device 302 sends to the DNS 306 a DNS request message 402 including a request to contact a predetermined domain name. According to an exemplary embodiment, the DNS request message 402 indicates the domain name of "server.xyz.com." When the DNS 306 receives the DNS request message 402, the DNS 306 may perform one or more load balancing algorithms to select a server that may service the request.

Suitable load balancing mechanisms include load balancing communication session assignment by consideration of one or more of the following factors: available server system resources, a number of current sessions, a number of active sessions, a number of dormant sessions, or types of selected resources, etc. In addition, the algorithm may include round robin or a different algorithm. For example, if more than one server is assigned to a domain name, in one embodiment, the DNS 306 may track how many requests are forwarded to each server and then may select a server that manages the lowest number of requests. Alternatively, each server may be associated with a predetermined set of capabilities, and the DNS 306 may select a server based on the server's capabilities. Once the selection is made, the load data is updated based on the selection, e.g. the load on the selected server is increment. According to an embodiment illustrated in FIG. 6, the DNS 306 selects the server 324, and sends a DNS response message 404 to the client device 302. The DNS response message 404 includes the IP address ("149.112.150.101") of the server 324.

Responsive to receiving the DNS response message 404, the client device 302 sends an application request 406 to the server 324. However, since the server 324 has been allocated an IP address from the home agent's local pool of addresses, the application request 406 is first routed to the home agent 310. When the home agent 310 receives the application request 406, the home agent 310 forwards the application request to the foreign agent 318, as illustrated at 408. It should be understood that an IP tunnel may exist, such as an IP-IP tunnel, a GRE tunnel, or an L2TP tunnel or other tunneling protocol, between the home agent 310 and the foreign agent 318, and the home agent 310 may forward the request via the IP tunnel.

When the foreign agent 318 receives the application request 408 from the home agent 310 via the IP tunnel, the foreign agent 318 may remove the tunnel headers and forward the request to the server 324, as illustrated at 410. When the server 324 receives the application request, the server 324 responds directly to the client device 302, as illustrated in an application response message 412.

It should be understood that the DNS 306 may store information associating the client device 302 sending application requests with a server, i.e., the server 324 in FIG. 6, selected to process a first application request. In such an embodiment, the DNS 306 may be configured to receive a subsequent DNS request from the client device 302, retrieve the stored information associating the client device 302 with the selected server 324, and then return the IP address of the server 324 so that the subsequent application request is sent to the server 324 identified in the stored information.

Further, it should be understood that the exemplary embodiments are not limited to the DNS server 306 load balancing between available servers. Alternatively, a distributed load balancing architecture could also be developed. In such an embodiment, each data center may include a DNS server adapted to communicate with the DNS server 306. When the DNS server 306 receives the DNS request 402, the DNS server may select a data center and forward the request to a DNS server at the selected data center. The DNS server at the data center may have detailed load records for each server at the data center, and, when the DNS server receives the request, it may select a predetermined server at the data center to service the request, and then may send a network IP address of the selected server to the DNS server 306.

FIG. 7 is a block diagram illustrating a message flow 450 for load balancing client requests according to another exemplary embodiment. Specifically, the embodiment illustrated in FIG. 7 illustrates processing client requests in a system using a reverse tunneling mechanism. Similarly to the FIG. 7, the message flow 450 will be described in reference to the devices illustrated in FIG. 4.

Referring to FIG. 7, the client device 302 sends to the DNS 306 a DNS request message 452 including a request to connect to a predetermined domain name. Specifically, the DNS request 452 includes a request to contact "server.xyz.com." When the DNS 306 receives the DNS request 452, the DNS 306 uses its load-balancing algorithms to select a server to service the request. The DNS 306 then sends a DNS response message 454 to the client device 302, and the DNS response message 454 includes an IP address of the server 324 (the IP address of "149.112.150.101").

When the client device 302 receives the DNS response 454, the client device 302 generates and sends an application request 456 to the server 324. However, since the IP address of the server 324 has been allocated from the IP address pool of the home agent 310, the application request 456 is first routed to the home agent 310. When the home agent 310 receives the application request 456, the home agent 310 routes the application request to the foreign agent 318, as illustrated at 458. Similarly to the message flow discussed in reference to FIG. 6, an IP tunnel may exist between the home agent 310 and the foreign agent 318. In such an embodiment, before routing the request to the foreign agent 318, the home agent 310 may add a tunnel header to the request and then may forward the modified request to the foreign agent 318.

When the foreign agent 318 receives the application request 458, the foreign agent 318 removes the tunnel headers from the received request, and forwards the request to the server 324, as illustrated at 460. In the exemplary system using the reverse tunneling mechanism, an application response message 462 generated at the server 324 is routed to the client device 302 via the foreign agent 318. When the foreign agent 318 receives the application response 462, the foreign agent 318 routes the application response to the home agent 310 via the IP tunnel, as illustrated at 464. Further, when the home agent 310 receives the application response, the home agent 310 removes any IP tunnel headers and forwards the application response to the client device 302, as illustrated at 466, and the message flow terminates.

FIG. 8 is a block diagram illustrating a message flow 500 for load balancing of client transactions in a system employing a route optimization mechanism that will be described in greater detail below.

Referring to FIG. 8, the client device 302 sends a DNS request message 502 to the DNS 306, and the DNS request message 502 includes the domain name "server.xyz.com." When the DNS 306 receives the DNS request message 502, the DNS 306 uses one or more load balancing algorithms to select a server for processing the request. The DNS 306 then sends a DNS response message 504 to the client device 302. According to an exemplary embodiment, the DNS response message 504 includes the IP address of the server 324, i.e., the IP address of "149.112.150.101."

When the client device 302 receives the DNS response message 504, the client device 302 sends an application request message 506 to the server 324. According to an exemplary embodiment, since the server 324 has been allocated an IP address from the home agent's IP address pool, the application request is first routed to the home agent 310. When the home agent 310 receives the application request 506, the home agent 310 forwards the request to the foreign agent 318, as illustrated at 508. If an IP tunnel is utilized for communications between the home agent 310 and the foreign agent 318, the home agent 310 inserts an IP tunnel header into the application request and forwards the request to the foreign agent 318 via the IP tunnel. When the foreign agent 318 receives the application request via the IP tunnel, the foreign agent 318 removes the IP header and forwards the application request to the server 324, as illustrated at 510.

When the server 324 receives the application request, the server 324 sends a binding update message 512 to the client device 302. According to an exemplary embodiment, the binding update message 512 includes an IP address of the foreign agent 318 so that the client device 302 can tunnel IP packets directly to the foreign agent 318, instead of routing packets via the home agent 310. When client device 302 receives the binding update message 512, the client device 302 establishes an IP tunnel to the foreign agent 318. The server 324 also sends an application response message 514 to the client device 302. Further, when the client device 302 sends a next application request to the server 324, the client device 302 sends the application request via the established IP tunnel to the foreign agent 318, as illustrated at 516. When the foreign agent 318 receives the application request, the foreign agent 318 removes any IP tunnel headers from the request and forwards the application request to the server 324, as illustrated at 518. When the server 324 receives the application request, once again, the server 324 sends an application response directly to the client device 302, as illustrated at 520, and the message flow terminates.

Although exemplary embodiments have been described in the context of an IP network, the exemplary methods could also be applicable to other communications networks where it is desirable to provide for load balancing across multiple server sites.

It should be understood that the programs, processes, methods, systems and apparatus described herein are not related or limited to any particular type of computer apparatus (hardware or software), unless indicated otherwise. Various types of general purpose or specialized computer apparatus may be used along with the present invention or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, variations may be made in the message flow scenarios other than those described, and more or fewer elements or components may be used in the block diagrams. Further, the steps of the flow diagram may be taken in sequences other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

What is claimed:

1. A method for dynamic network address assignment to a plurality of servers at a data center, the method comprising:
providing a plurality of foreign agents at the data center, the data center further including a plurality of servers to process client transactions;
providing a plurality of home agents at a content owner server site;
using at least one of said plurality of home agents to dynamically assign a network address to each of the plurality of servers at the data center utilizing the Mobile Internet Protocol, wherein using the Mobile Internet Protocol to dynamically assign a network address to each of the plurality of servers at the data center comprises:
selecting a foreign agent for each of the plurality of servers;
sending a registration request message comprising a request for a network address assignment from each server to the selected foreign agent;
determining a home agent to service the registration request, wherein the one agent is selected from the plurality of home agents;
forwarding the registration request message from the foreign agent to the selected home agent;
allocating a network address to the server at the home agent; and
providing the network address to the server;
receiving a domain name request from a client device at the content owner site;
selecting one of the plurality of servers to service the request based in part on providing a balanced load to the plurality of servers utilizing the Mobile Internet Protocol;
providing a network address of the selected server to the client device; and
using a redirect feature of the Mobile Internet Protocol to route and application request from the client device to the selected server.

2. The method of claim 1, wherein determining a home agent to service the registration request comprises:
sending an access request message from the selected foreign agent to an authorization, authentication and accounting server;
determining a network address of the home agent at the authorization, authentication and accounting server; and
sending an access response message from the authorization, authentication, and accounting server to the foreign agent, wherein the access response comprises the network address of the home agent.

3. The method of claim 1, wherein determining a home agent to service the registration request comprises:
sending an access request message from the selected foreign agent to an authorization, authentication and accounting server;
sending an access response message from the authorization, authentication and accounting server to the foreign agent, wherein the access response message comprises instructions for the selected foreign agent to assign a home agent address from a predetermined pool of home agent addresses; and
determining a network address of a home agent at the foreign agent based on the instructions provided from the authorization, authentication and accounting server.

4. The method of claim 1, further comprising:
receiving the application request at the selected server;
processing the application request to form an application response to the application request; and
sending the application response from the selected server to the client device.

* * * * *